US010826851B2

(12) United States Patent
Ergen

(10) Patent No.: US 10,826,851 B2
(45) Date of Patent: Nov. 3, 2020

(54) METHOD AND SYSTEM FOR ROUTING DELAY-TOLERANT COMMUNICATION MESSAGES TO A DESTINATION DEVICE

(71) Applicant: Ambeent Wireless Bilişim ve Yazilim A.Ş, Istanbul (TR)

(72) Inventor: Mustafa Ergen, Istanbul (TR)

(73) Assignee: Ambeent Inc., Istanbul (TR)

( * ) Notice: Subject to any disclaimer, the term of this patent is extended or adjusted under 35 U.S.C. 154(b) by 0 days.

(21) Appl. No.: 16/516,172

(22) Filed: Jul. 18, 2019

(65) Prior Publication Data
US 2020/0028804 A1    Jan. 23, 2020

Related U.S. Application Data

(60) Provisional application No. 62/764,065, filed on Jul. 18, 2018.

(51) Int. Cl.
*H04L 12/58* (2006.01)
*H04W 4/21* (2018.01)
(Continued)

(52) U.S. Cl.
CPC ............. *H04L 51/02* (2013.01); *G06N 3/08* (2013.01); *H04L 51/20* (2013.01); *H04L 51/32* (2013.01);
(Continued)

(58) Field of Classification Search
CPC ......... H04L 51/02; H04L 51/20; H04L 51/32; H04W 4/029; H04W 4/21; H04W 4/12; H04W 84/18; G06N 3/08
(Continued)

(56) References Cited

U.S. PATENT DOCUMENTS

| 2005/0054346 A1* | 3/2005 | Windham | H04L 45/00 455/445 |
| 2009/0209349 A1* | 8/2009 | Padhye | H04L 67/1063 463/42 |

(Continued)

FOREIGN PATENT DOCUMENTS

| CN | 106535279 A | * | 3/2017 | ............ H04W 40/12 |
| CN | 107333312 B | * | 11/2017 | ............ H04W 40/02 |

*Primary Examiner* — Mong-Thuy T Tran
(74) *Attorney, Agent, or Firm* — IPpro Services

(57) ABSTRACT

The invention provides a method and system for routing delay-tolerant communication messages to a destination device. The method and system creates an ad-hoc communication network for transmitting and/or receiving a delay-tolerant communication message by clustering a plurality of devices to form a social community. The delay-tolerant communication message received from a device connected to an ad-hoc hotspot is transmitted to the destination device using one or more moving subscribers/nodes. The method and system selects the one or more moving subscribers/nodes using a deep learning algorithm based on an MRC feature of the one or more moving subscribers/nodes, and transmits the delay-tolerant communication message from a device in the social community to the selected one or more moving subscribers/nodes. The delay-tolerant communication message is then relayed/forwarded to the destination device via the one or more moving subscribers/nodes either directly or via hand-off from one moving subscriber/node to another moving subscriber/node.

23 Claims, 6 Drawing Sheets

(51) Int. Cl.
  *H04W 4/029*   (2018.01)
  *G06N 3/08*   (2006.01)
  *H04W 4/12*   (2009.01)
  *H04W 84/18*   (2009.01)

(52) U.S. Cl.
  CPC ............ *H04W 4/029* (2018.02); *H04W 4/12* (2013.01); *H04W 4/21* (2018.02); *H04W 84/18* (2013.01)

(58) Field of Classification Search
  USPC ..................................... 455/412.1
  See application file for complete search history.

(56) References Cited

U.S. PATENT DOCUMENTS

| | | | |
|---|---|---|---|
| 2016/0065405 A1* | 3/2016 | Wang ................. | H04W 56/001 370/254 |
| 2017/0339011 A1* | 11/2017 | Condeixa ................ | H04W 4/70 |
| 2018/0132307 A1* | 5/2018 | Almeida Neves .. | H04W 84/005 |
| 2018/0152824 A1* | 5/2018 | Baker ..................... | H04W 4/21 |
| 2019/0059041 A1* | 2/2019 | Francisco ............ | H04W 40/246 |
| 2019/0205745 A1* | 7/2019 | Sridharan ............ | G06N 3/0445 |
| 2019/0215753 A1* | 7/2019 | Sathya ................. | H04W 40/10 |

* cited by examiner

METHOD AND SYSTEM FOR ROUTING DELAY-TOLERANT COMMUNICATION MESSAGES TO A DESTINATION DEVICE

CROSS-REFERENCE TO RELATED APPLICATION

This application claims the benefit of U.S. Provisional Application No. 62/764,065, filed on Jul. 18, 2018, entitled "METHOD AND SYSTEM FOR OMNIBUS NETWORKING FOR ETERNAL COMMUNICATION TO INTRODUCING PEOPLE'S INTERNET", which application is incorporated herein by reference in its entirety and for all purposes.

FIELD OF THE INVENTION

The invention generally relates to an open digital information exchange leveraging smart phone device penetration and existing transportation infrastructure or networks to bring mobile data to vulnerable and/or offline communities in remote regions. More specifically, the invention relates to routing delay-tolerant communication messages to a destination device by selecting one or more moving subscribers/nodes such as, but not limited to, moving vehicles, using deep learning algorithms to chart out mobility patterns of the one or more moving subscribers/nodes to ensure that messages reach the destination device in the most efficient way.

BACKGROUND OF THE INVENTION

Conventionally, communication is mainly carried by fixed, mobile and satellite networks. Ad-hoc networking is also available as a special and instant type of network that is set up and brought down according to the need and availability of a user. An ad-hoc network is owned by users participating in it while limiting size and range of communication.

On the other hand, fixed, mobile and satellite networks rely on bulky, central networking architectures. Recently, ad-hoc networking has been used in homes as a few-hop wireless mesh network or a backhaul connectivity or a vehicle-to-vehicle communication for limited distance communication. In contrast, networks with a central infrastructure provide higher quality and broader coverage but are fragile in the face of calamities such as a natural disaster or war. Therefore, such networks limit the basic rights of an individual to communicate and exchange information, and reduces the availability of internet for most of the people.

Moreover, a central infrastructure is costly and market dynamics prevent it from reaching broader geographies due to lack of affordability. Hence, a central infrastructure is best suited for densely populated areas, which can afford fixed or cellular networks. Investments in central infrastructures also face limitations due to the scarcity of the available spectrum resulting in high costs, useful lives of assets and age of networks. These limitations partly account for half of the population lacking access to information and communication. To overcome these bottlenecks, major internet corporates are investing heavily in satellites, balloons, or drones which are High-Altitude Platform (HAP) technologies. If successful, these technologies help the internet reach billions of people, providing the necessary geographical coverage. Nonetheless, coverage still suffers from the above-mentioned costs and vulnerabilities.

Moreover, a significant amount of the world's population remains offline and a lack of internet access remains a problem affecting all communities in remote areas, rural areas, especially in developing countries.

Also, current digital infrastructures are vulnerable to disaster situations where a single point of failure in infrastructure can bring down the entire communication network. There are solutions that rely on special hardware or custom modified mobile systems. However, there is no easy way to implement solutions that can provide instant communication to people in a disaster zone.

In hitherto known scenarios for connectivity, social media has become an important part of mobile applications as density of mobile and Wireless Fidelity (Wi-Fi) devices increase with high speed internet access. However, a significant part of social media applications requires a membership to a web based platform and provides several options to the members based on Global Positioning System (GPS) or other type of activities. Due to this, instant connectivity and access is hindered.

Therefore, in light of the above, there is a need for a method and system for bringing affordable mobile data to vulnerable communities in remote regions without relying on centralized, costly and complicated infrastructure networks.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
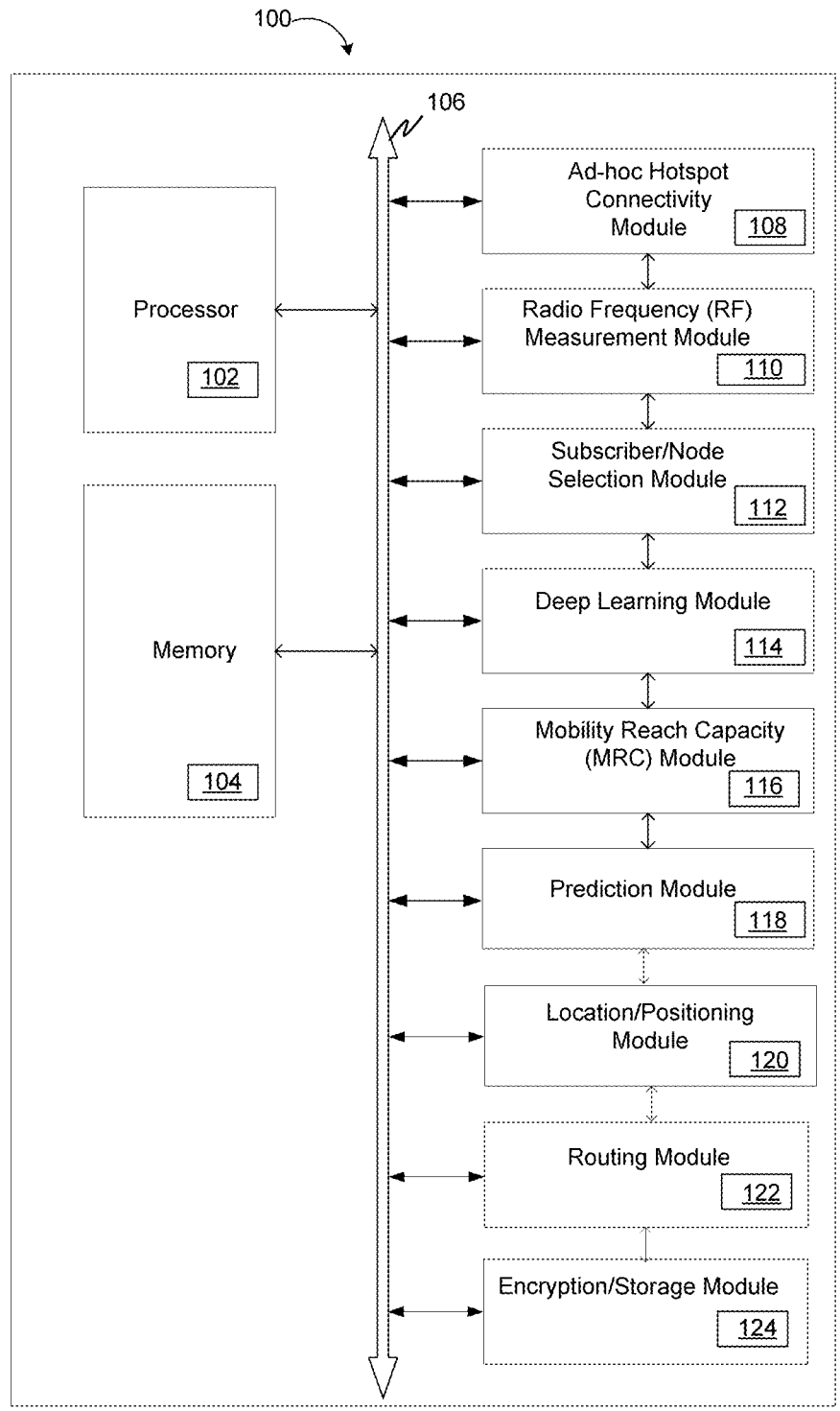
FIG. 1 illustrates a system for routing delay-tolerant communication messages to a destination device in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to routing delay-tolerant communication messages to a destination device by selecting one or more moving subscribers/nodes such as, but not limited to, moving vehicles, using deep learning algorithms to chart out mobility patterns of the one or more moving subscribers/nodes to ensure that messages reach the destination device in the most efficient way.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for routing delay-tolerant communication messages to a destination device. A delay-tolerant communication message can be, but need not be limited to, a chat message and an email message. The method and system creates an ad-hoc communication network for transmitting and/or receiving the delay-tolerant communication message by clustering a plurality of devices to form a social community. The method and system enables a device of the plurality of devices located in a vicinity without internet, to connect to an ad-hoc hotspot either by entering a hotspot mode or joining a hotspot of another device in the social community to connect and share data/message. The delay-tolerant communication message received from a device connected to the hotspot is transmitted to the destination device using one or more moving subscribers/nodes. The method and system selects one or more moving subscribers/nodes using a deep learning algorithm, based on a Mobile Reach Capacity (MRC) of the one or more moving subscribers/nodes. The MRC denotes that a moving subscriber/node travels to a destination where it can be connected to a communication infrastructure. Upon selecting the one or more moving subscribers/nodes, the method and system transmits the delay-tolerant communication message from a device in the social community to the selected one or more moving subscribers/nodes. The delay-tolerant communication message is then relayed/forwarded to the destination device via the one or more moving subscribers/nodes either directly or via hand-off from one moving subscriber/node to another moving subscriber/node.

FIG. 1 illustrates a system 100 for routing delay-tolerant communication messages to a destination device in accordance with an embodiment of the invention.

As illustrated in FIG. 1, system 100 includes a processor 102 and a memory 104 communicatively coupled to processor 102. Processor 102 and memory 104 further communicate with various modules via a communication module 106. Communication module 106 may be configured to transmit data between modules, engines, databases, memories, and other components of system 100 for use in performing the functions discussed herein. Communication module 106 may include one or more communication types and utilize various communication methods for communication within system 100.

System 100 leverages several Wireless Ad-Hoc Networking (WANET) technologies including, but not limited to, Mobile Ad-hoc Networking (MANET), Wireless Mesh Networking (WMN), Wireless Sensor Networking (WSN), Swarm Robotics, and to an extent Delay Tolerant Networking (DTN) and Vehicular Ad-hoc Networking (VANET). These networks are leveraged to introduce a comprehensive end-to-end communication system between any source and destination pair. For instance, MANET focuses on solving the ad hoc routing problem so that a fixed routing path is established between nodes. It is mostly used in military applications and Swarm Robotics. WSN focuses on routing in Internet of Things (IoT) applications to gather information from a massive number of sensors towards a central sink. VANET focuses on vehicle safety and vehicle connectivity. DTN focuses on the "store and forward" transport layer and is used in inter planetary communication.

WANET is a decentralized packet switching technique. The network is ad-hoc because it does not rely on a pre-existing infrastructure, such as routers in wired networks or access points in managed (infrastructure) wireless networks.

Routing algorithms aim to ensure end-to-end connectivity between any source and destination pair. After the route has been established, the actual data is forwarded. The main routing concern is to maintain up to-date routes for all hosts. MANET, on the other hand, has nodes that are mobile and the topology of the network changes constantly. Nevertheless, connectivity with the nodes is still assured while the path linking one node to another change regularly.

Such intermittently connected networks (ICT) must tolerate delays beyond those of common IP forwarding. Hence, the ICT is classified as delay/disruption tolerant networks (DTN). DTNs include mobile ad-hoc moving subscribers/nodes and in the DTN, an end-to-end path between one or more moving subscribers/nodes cannot be assumed. Consequently, information travels gradually with "store and forward" approach before reaching the destination. The DTN method is based on message switching hop-by-hop routing in a high mobility environment. The DTN uses multi-copy (replication and flooding) or a single copy (forwarding and heuristic) based strategies for messages to reach the destination. Examples of such networks are in mobile or extreme terrestrial environments, or networks in space (Interplanetary Internet). Therefore, the DTN focuses on smaller size networks where the routing overheads get incrementally larger as the size of the network grows.

Further, VANET is built on the principles of MANETs. Although VANET became synonymous with the generic term inter-vehicle communication, it also covers vehicle to infrastructure such as, but not limited to, Road Side Units (RSUs) or vehicle to cellular network communication. Rather than moving randomly, vehicles tend to move in an organized fashion based on vehicles' range of motion constrained by a paved highway. Similarly, vehicles interactions with roadside equipment can be characterized as organized in an accurate way.

Furthermore, position-based routing has emerged as a promising option for communication in VANETs. Mobile IPv6 proxy-based architecture is viewed as the best communication mode for mobile nodes (direct in vehicle, vehicle to vehicle and vehicle to roadside communication) in terms of session continuity and reachability to the Internet. However, VANET is different than MANET in terms of its architecture because it uses both WLAN and ad hoc, while MANET is only, or is mainly an ad-hoc architecture. VANET also has properties that distinguish it from MANET, which may include, but need not be limited to, a sufficient energy storage, various communication environments, hard delay constraints, interaction with onboard sensors, and geographical type of communication.

The sufficient energy storage property of the VANET is used to determine that the nodes are vehicles that run on their own battery with enough computing power for storage and for processing. Similarly, various communication environments include direct line of communication in highway traffic scenarios and indirect line of communication in city environments due to intersections with streets or other obstacles. Further, hard delay constraints provide assurance that the message is received within a specified real-time computing in emergencies to prevent car crashes. Subsequently, interaction with onboard sensors is used to provide information that can be utilized to form communication links and routing the information by using nodes or vehicles equipped with the onboard sensors. Additionally, the geographical type of communication is used to multicast data from vehicles to a group of nodes based on their geographical information using GPS.

Moreover, WMN is another form of WANET, where radio nodes are organized in a mesh topology and all nodes cooperate in distributing data in the network. Another subclass of WANET is WSNs, which is used to spatially distribute autonomous sensors to monitor physical or environmental conditions. The monitored data is passed together through the network to reach a main location.

Additionally, system 100 uses a Smart Phone Ad-Hoc Networking (SPAN), which is a form of DTN and leverages existing hardware (primarily Bluetooth, Wi-Fi and LTE Direct) in commercially available devices such as, but not limited to, mobiles, to create peer-to-peer networks without relying on cellular carrier networks. Also, system 100 makes use of Pocket Switched Networks (PSN) technologies, which employ human mobility and connectivity for data transfer between mobile devices. System 100 further leverages a village communication network which is another form of the DTN, used in remote communities. This village communication network includes a data mule equipped with an antenna that communicates with base stations located in the city and in the village. Once the data mule enters the village, the data mule can deliver the messages to the village by connecting to the base station and downloading the data that is destined back to the city.

System 100 includes an ad-hoc hotspot connectivity module 108 to create an ad-hoc communication network for transmitting and/or receiving a delay-tolerant communication message. The delay-tolerant communication message can be, but need not be limited to, a chat message or an email message. The delay-tolerant communication message further includes a destination address of a destination device, the destination address including, but not limited to, a local address, a global address, a multicast/broadcast address, and a geographic address.

The ad-hoc communication network is created by clustering a plurality of devices to form a social community. The plurality of device may include, but need not be limited to, a mobile device, a cellular phone, a Wi-Fi module integrated handset, a tablet, a laptop, and the like. The plurality of devices are clustered based on Received Signal Strength Indicator (RSSI) and signals received from a same access point (AP) in the social community using a Radio Frequency (RF) measurement module 110 to connect and share any data/message.

In an embodiment, system 100 provides a platform for Wi-Fi devices which can connect and share any data after they are clustered based on the RSSIs they receive. Unlike traditional GPS focused social platforms, system 100 groups the Wi-Fi users under the criterion of receiving signal from the same AP. Wi-Fi users in a network might receive signals from different APs and share the data with other stations (STAs) when they encounter a unique AP which is a member of the platform. The users can track distribution of their data and the number of users to which they delivered their data through the platform.

RF measurement module 110 in various devices and computers scans the RF environment constantly to report probable Wi-Fi APs for connection or offloads cellular data to Wi-Fi from externally installed applications. The scan procedure covers the whole unlicensed spectrum which is divided into several channels based on country regulations.

RF measurement module 110 may be installed on two different hardware. The first and usually preferred implementation is as an application on any STA. Currently, some devices provide the scanning functionality from externally installed applications, whereas other devices are limited to rooted devices only, based on the operating system of the devices. The second hardware is the APs. The APs determine the modulation for a data packet based on the RSSI from the STAs to which it is connected. Usually, the APs do not deliver or stream this to a cloud or any other software unless a specific software is installed on the APs. Finally, with the addition of both hardware and software, some APs scan their environment directly, thus eliminating the need of an STA for RF measurement.

Typically, RF measurement module 110 delivers the nearby AP media access control (MAC), RSSI from the corresponding AP at each scan and for each nearby AP, including the connected AP. Once the measurements from several STAs are stored on the cloud, which are evaluated and processed by a backend algorithm, the centralized decision making and clustering of Wi-Fi users becomes feasible. RF measurement module 110 is further described in detail in conjunction with FIG. 2.

Moving on, the ad-hoc communication network functions as an omnibus communication network, which becomes operational if a device of the plurality of devices located in a vicinity without internet connects to an ad-hoc hotspot either by entering a hotspot mode, where a device sets up its own hotspot, or by joining a hotspot of another device in the social community.

Initially, the device scans the environment for an omnibus communication network Service Set Identifier (SSID) number (Wi-Fi name). If the device is unable to detect the omnibus communication network, the device launches or sets up its own hotspot, which functions as a local server for other devices in its vicinity to communicate with each other. Subsequently, the plurality of devices connected with similar omnibus communication networks are automatically included in a local network loop to form a simplified mesh network.

Further, ad-hoc hotspot connectivity module 108 periodically ensures that the act of entering the hotspot mode is shared in a fair manner among the plurality of devices in the social community. Each device that sets up a hotspot is assigned an SSID and a number, which is used to track the number of times the device acts as a hotspot provider, thus implementing hotspot fairness.

In accordance with an embodiment, the device in hotspot mode receives delay-tolerant communication messages from all connected devices and concatenates them to reach their destination. In parallel, each connecting device also synchronizes and stores all the data, which is being transmitted by smart devices connected to the hotspot. By storing all messages in each device, system 100 allows for shifting the device that transmits the hotspot. The data is once again used to determine who will carry the data outside of a given vicinity.

To carry the data outside of a given vicinity, system 100 includes a subscriber/node selection module 112 which selects one or more moving subscribers/nodes from a plurality of moving subscribers/nodes using a deep learning module 114. The one or more moving subscribers/nodes may include, but need not be limited to, one of a vehicle, and a pedestrian carrying a Wi-Fi integrated communication device. The vehicle can be, but need not be limited to, a car, a truck, a bus, a train, a ship, and the like. Further, the Wi-Fi integrated communication device may include, but need not be limited to, a mobile device, a smart phone, a handset, a laptop, and a tablet.

Deep learning module 114 is used to select the one or more moving subscribers/nodes based on an MRC feature of the one or more moving subscribers/nodes which is determined using an MRC module 116 in conjunction with deep learning module 114. The MRC denotes that one or more moving subscribers/nodes are travelling to a destination where they can be connected to a communication infrastructure. The communication infrastructure can be, but need not be limited to, an Internet, a fixed network, a mobile network, and a satellite network.

Further, deep learning module 114 leverages MRC and pre-determined mobility patterns using smart mobility infrastructures which may include, but need not be limited to, drive sharing or self-driving databases for enabling selection of the one or more moving subscribers/nodes. MRC module 116 also measures a travelling frequency and destination traveled to, for determining the MRC of the one or more moving sub scribers/nodes.

For instance, a moving subscriber/node having zero MRC indicates that the moving subscriber/node is not travelling to a destination where it can be connected to the Internet (via a Wi-Fi or cellular network) or in fact to any destination that is outside of its vicinity. Such moving subscribers/nodes do not need to store messages which are destined outside of a given vicinity, and are not selected for carrying the delay-tolerant communication messages to the destination.

System 100 also includes a prediction module 118 to predict a time and destination of a trip for the one or more moving subscribers/nodes using a Cartesian Neural Network for selecting the one or more moving subscribers/nodes.

Upon selecting the one or more moving subscribers/nodes, the delay-tolerant communication message is transmitted from a receiving device in the social community to the one or more moving subscribers/nodes.

In an embodiment, system 100 includes a location/positioning module 120 to determine a current location and a destination location of the one or more moving subscribers/nodes in vicinity of the plurality of devices connected to the hotspot and transmits the delay-tolerant communication message to the corresponding one or more moving subscribers/nodes.

System 100 further includes a routing module 122 for relaying or forwarding the delay-tolerant communication message to the destination device.

The delay-tolerant communication message is forwarded through the one or more moving subscribers/nodes to the destination device based on GPS coordinates predefined or set by the one or more moving subscribers/nodes and the location coordinates added to an outgoing delay-tolerant communication message.

System 100 further includes an encryption/storage module 124 which encrypts and stores the delay-tolerant communication message on the one or more moving subscribers/nodes.

In an embodiment, the delay-tolerant communication message is progressively relayed or forwarded to the communication infrastructure via routing module 122, which enables the one or more moving subscribers/nodes to select one or more other moving subscribers/nodes to hand off the delay-tolerant communication message, using location/positioning module 120.

Figure 2:
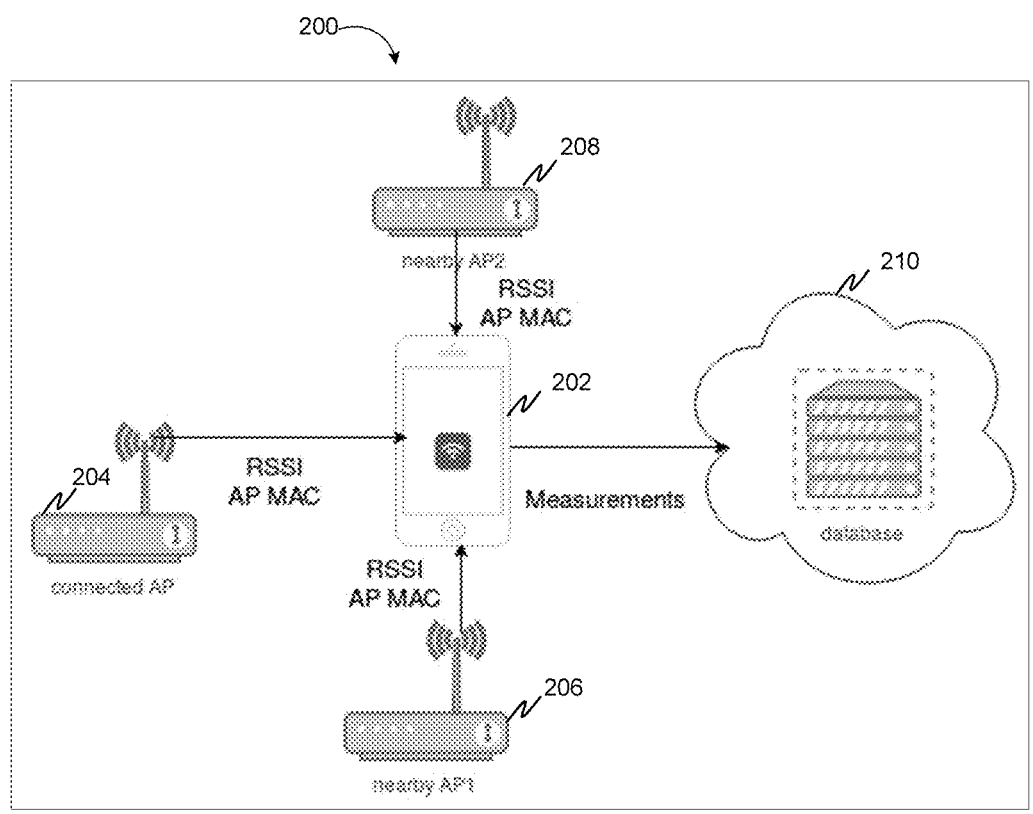
FIG. 2 illustrates a Radio Frequency (RF) measurement module to scan Received Signal Strength Indicator (RSSI) of a plurality of devices for clustering the plurality of devices to form a social community in accordance with an embodiment of the invention.

FIG. 2 illustrates RF measurement module 110 to scan RSSI of a plurality of devices for clustering the plurality of devices to form a social community in accordance with an embodiment of the invention.

As illustrated in FIG. 2, a device 202 of a plurality of devices located in a vicinity without interne, scans constantly for an RF environment to identify a portable Wi-Fi AP from a plurality of Wi-Fi APs 204, 206 and 208 which are created or set up on their own using externally installed applications.

For instance, device 202 of the plurality of devices scanning for a Wi-Fi device or an AP finds a hotspot or an AP 204 set up by another device of the plurality of devices. Subsequently, device 202 establishes a connection with AP 204 based on RSSI received by device 202 for transmitting and/or receiving delay-tolerant communication messages.

Referring to FIG. 2, APs 204, 206 and 208 determine the modulation for a data packet based on the RSSI received from the plurality of devices and establishes a connection with AP 204 in vicinity of device 202. The APs 204, 206 and 208 deliver or stream the RF measurements to a cloud database 210 via RF measurement module 110 installed on APs 204, 206 and 208.

Typically, RF measurement module 110 delivers nearby AP (206 or 208) MAC, RSSI from the corresponding connected AP 204 at each scan and for each nearby AP (206, 208), including the connected AP 204. Once the measurements from the plurality of devices (STAs) are stored on the cloud, which are evaluated and processed by a backend algorithm, the centralized decision making and clustering of Wi-Fi users becomes feasible.

The measurements in the cloud are updated once a new set of measurements is available from a particular STA to reflect the last condition of the RF environment for the real-time analysis. An RSSI matrix between STAs and APs is not a full matrix since a particular STA receives a signal from a subset of the APs usually based on the locations of the APs, STAs and the environmental conditions that cause signal propagation.

Figure 3:
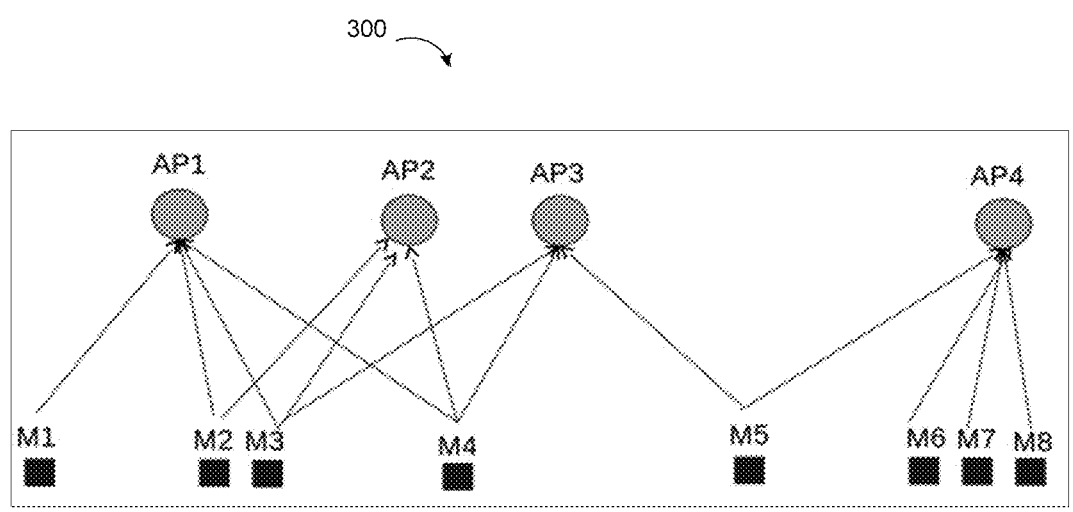
FIG. 3 illustrates a Wi-Fi communication network established between a plurality of device (STAs) and various Wi-Fi access points (APs) of the social community in accordance with an embodiment of the invention.

FIG. 3 illustrates a Wi-Fi communication network 300 established between the plurality of devices (STAs) and various Wi-Fi APs of the social community in accordance with an embodiment of the invention.

As illustrated in FIG. 3, Wi-Fi communication network 300 includes 8 STAs (M1, M2, M3, M4, M5, M6, M7, M8) and 4 APs (AP1, AP2, AP3, AP4).

A social platform is provided for the users of the plurality of STAs. The data from a particular STA under the signal coverage of a particular AP or a set of APs are carried to other locations when the users encounter or receive a signal from a different AP by sharing the data to the new group.

When an STA posts a message, the message is seen by all STAs that hear the same APs with the STA. Such STAs are referred to as followers. In some instances, all STAs receive all the messages that are transmitted by STAs that hear the same APs (followed).

Data such as, but not limited to, video, picture, text or any kind of data, from a particular STA is transferred to other locations which are under the coverage of a different AP. Thus, the followers and the followed sources should change as an STA is exposed to the transmission from other APs due to mobility. In turn, the data an STA receives, changes due to mobility since the STA becomes a member of a different community. The data from a community can be carried to any other community if the STAs want to distribute the data, unless the content expires within a predefined time interval.

The interactions from a particular STA result in the distribution of the shared data to all STAs due to block diagonal type matrix of STA and AP interactions as shown in Table 1 through the followers.

TABLE 1

| Mobile | AP1 | AP2 | AP3 | AP4 | #AP |
|---|---|---|---|---|---|
| M1 | 1 | | | | 1 |
| M2 | 1 | 1 | | | 2 |
| M3 | 1 | 1 | 1 | | 3 |
| M4 | 1 | 1 | 1 | | 3 |
| M5 | | | 1 | 1 | 2 |
| M6 | | | | 1 | 1 |
| M7 | | | | 1 | 1 |
| M8 | | | | 1 | 1 |

The list of followers in the follower matrix is detailed in Table 2.

TABLE 2

| Mobile | AP1 | AP2 | AP3 | AP4 | Followers |
|---|---|---|---|---|---|
| M1 | M2, M3, M4 | | | | 3 |
| M2 | M1, M3, M4 | M3, M4 | | | 3 |
| M3 | M1, M2, M4 | M2, M4 | M4, M5 | | 4 |
| M4 | M1, M2, M3 | M1, M2 | M3, M5 | | 4 |
| M5 | | | M3, M4 | M6, M7, M8 | 5 |
| M6 | | | | M5, M7, M8 | 3 |
| M7 | | | | M5, M6, M8 | 3 |
| M8 | | | | M5, M6, M7 | 3 |

The users can track the propagation of their data through metrics such as, but not limited to, the number of reposts, the distance the data travels, the number of re-posts, and the route the data follows.

The privileged user has to pay in order to broadcast particular data within a predefined frequency or range with additional options such as different colour or font.

In some cases, devices with a specific operating system (form example, iOS) limit the RF scan module from externally installed applications, hindering the potential social media applications based on RF measurements, since it is difficult to determine the social community without RF measurement. Once there is a nearby device with another operating system (for example, Android) available, the scan results are uploaded to the cloud, where it is smartly updated for the benefit of such devices even though Android devices are not necessarily connected to any particular Wi-Fi AP. Thus, Android devices provide data recursively to construct map of APs.

Figure 4:
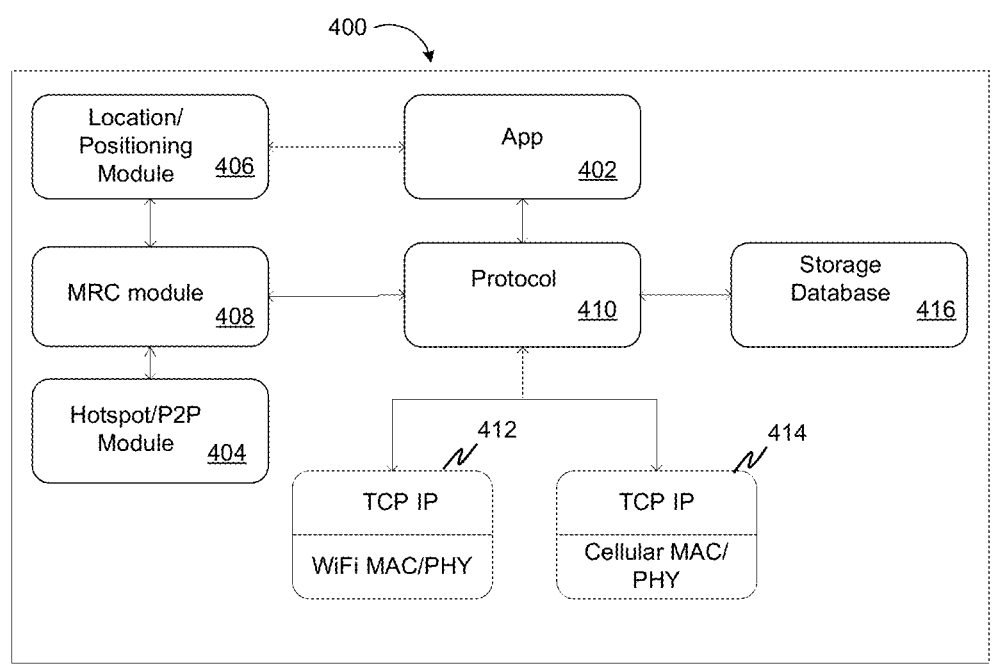
FIG. 4 illustrates a communication stack of the system for routing delay-tolerant communication messages to a destination device in accordance with an exemplary embodiment of the invention.

FIG. 4 illustrates a communication stack 400 of system 100 for routing delay-tolerant communication messages to a destination device in accordance with an exemplary embodiment of the invention.

As illustrated in FIG. 4, communication stack 400 includes an application (app) 402 on a smart device which first scans the environment for system 100 network SSID Number (the Wi-Fi Name). If the device is unable to detect the network, the device launches its own hotspot. The network of system 100 becomes operational when a smart device located in a vicinity without internet sets up its own hotspot or joins another device's hotspot via a hotspot/P2P module 404.

The smart device in hotspot mode functions as a local server for other devices in its vicinity to communicate with each other. The smart device owners with app 402 are automatically included in the local network loop to create a simplified mesh network. While a single user of app 402 acts as a hotspot for the entire community, the user of app 402 in hotspot mode shifts periodically to ensure that the act of entering the hotspot mode is a responsibility which is shared among community members in a fair manner. Each smart device user that opens a hotspot is assigned an SSID and a number, which is used to track the number of times the smart device acts as a hotspot provider. This information is used to implement hotspot fairness and make system 100 more flexible.

Each smart device connecting to the user of app 402 in hotspot mode receives an IP address from the hotspot's Dynamic Host Configuration Protocol (DHCP)/Network Address Translation (NAT) server. In turn, the connecting devices send an authentication request message to the hotspot. An authentication request message includes information such as, but not limited to, an object, header, ID, MAC ID, chat ID, email, supported apps, MRC, position, hotspot fairness index, and hotspot ID.

The users of app 402 in vicinity hold information about all devices that are connected to the same network in a secured format. This information allows to build a local database for the neighbourhood. For instance, each device captures the location of the hotspot with the RSSI with which it can determine its own location in relation to the hotspot via GPS using a location/positioning module 406. This location package is sent to other devices associated with the hotspot. Hence, every device connected to the hotspot has the location information from multiple devices. The location system is further strengthened by attaching a GPS location to each outbound message.

App 402 further includes a map feature which charts out unconnected communities allowing users in vehicles to select messages to carry to these communities prior to their journey, using the information obtained from location/positioning module 406. It is also used for targeting broadcast messages to any unconnected area.

App 402 in hotspot mode receives messages from all connected devices and concatenates them to reach their destination. In parallel, each connecting device also synchronizes and stores all the data, which is being transmitted by smart devices connected to the hotspot. By storing all messages in each device, hotspot/P2P module 404 allows for shifting the user that transmits the hotspot. The data is once again used to determine who will carry the data outside of a given vicinity.

Moreover, app 402 in all connected smart devices removes duplicate messages and stores messages based on their MRC determined using an MRC module 408. The MRC is a measure that combines the travelling frequency and the destinations. For instance, if a smart device has zero MRC, it means the device is not travelling to a destination where it can be connected to the Internet (via a Wi-Fi or a cellular network) or in fact to any destination at all that is outside of its vicinity.

Hence, the device in question does not need to store messages, which are destined outside of a given vicinity. The MRC feature is a deep learning algorithm which also leverages already determined patterns of mobility provided by smart mobility infrastructures such as, but not limited to, drive sharing, and self-driving databases. Further, Cartesian Neural Network is utilized for predicting the time and destination of the next trip for each subscriber. The MRC feature is also central to incentivizing usership and making the system sustainable.

Communication stack 400 employs a protocol 410 in communication with protocol layers (412, 414) for performing an incoming/outgoing message procedure described herein. The protocol layers include TCP/IP protocol with Wi-Fi Media Access Control/Physical (MAC/PHY) 412, and a TCP/IP protocol with cellular MAC/PHY layer 414.

In some embodiments, communication stack 400 is further integrated to an Open Systems Interconnection (OSI) networking stack. The following elaborates different phases of development of protocol 410: protocol 410 application layer, protocol 410 transport layer, protocol 410 routing layer, and MAC protocol of protocol 410.

Protocol 410 application layer phase addresses app 402 in a single vehicle transporting data over the cloud. The single vehicle can also carry the message itself without connecting to the cloud.

In protocol 410 transport layer phase, packet switching is introduced and more than one app 402 is utilized in transport mode. Protocol 410 transport layer increases the capacity of the system, for instance, two packages can be carried by two different vehicles. It can also help to increase robustness of the system through repetition, for instance, by carrying a single message through more than one vehicle/car. As in DTN, the transport system in question has bundle protocols and storage capacity.

Protocol 410 routing layer introduces transfer of data between vehicles during transportation. For instance, if a user of app 402 in a vehicle with zero MRC is near another user in a vehicle which has high MRC, it can transfer the data to the latter.

MAC protocol phase increases the granularity further by introducing a new algorithm that establishes links between layers. This facilitates automatic hotspot logon (in line with system 100's hotspot fairness principle) and associations with corresponding link layers with MRC messaging. Also, the MAC protocol can be created, similar to the 802.11 monitor mode, which makes broadcast mode possible in addition to the unicast mode.

Moving on, an outbound message is defined as a message that is destined out of the vicinity of the hotspot. The communication process for the subscribers using app 402 is detailed as follows.

A subscriber is aware of other subscribers that are connected to the same hotspot through the authentication procedure. An authenticated subscriber creates an encrypted message on app 402 and sends the message to a destination address which can be, but need not be limited to, a local or global address, a multicast/broadcast address, an email, or a geographic address indicated on the map feature of app 402.

App 402 in hotspot mode detects whether the message is destined to a local subscriber address. If the message is destined to a local subscriber address, app 402 in hotspot mode swiftly forwards it to app 402 of the local subscriber. Else, the outbound message is forwarded to subscribers with a high MRC. Each subscriber stores all the outbound messages in a storage database 416 and depending on its MRC obtained from MRC module 408, a subscriber may filter and delete messages from storage database 416.

Most of the messages destined out of the vicinity of the hotspot are destined to a cloud server and reach the cloud server once the moving vehicle finds an internet connection. In an instance, chat messages may be relayed to their destination directly without reaching an internet connection by a single moving vehicle or by being transferred to another vehicle travelling to the message destination. For instance, a subscriber in a moving vehicle on his way to a location with an internet connection may first come across a subscriber in another moving vehicle, which is travelling to a location where the message is destined.

For messages destined to a remote area (inbound messages), algorithms in the cloud server decide on the best moving vehicle to carry the messages to their destination.

As described above, an outgoing message is defined as the message that is destined out from that hotspot location. Each device stores the outgoing messages. Outgoing messages include, but need not be limited to, location messages, chat messages, emails, app requests (such as web, video). For example, all emails are outgoing messages and their destination is the cloud server via internet connection. Similarly, location messages and chat messages are the same and are destined to the cloud server, however some chat messages may be relayed to a destination directly or via a next hop to the destination before reaching an internet connection. For instance, a subscriber on his way to an internet connection may find a subscriber to a location where a message it stores is destined.

Figure 5:
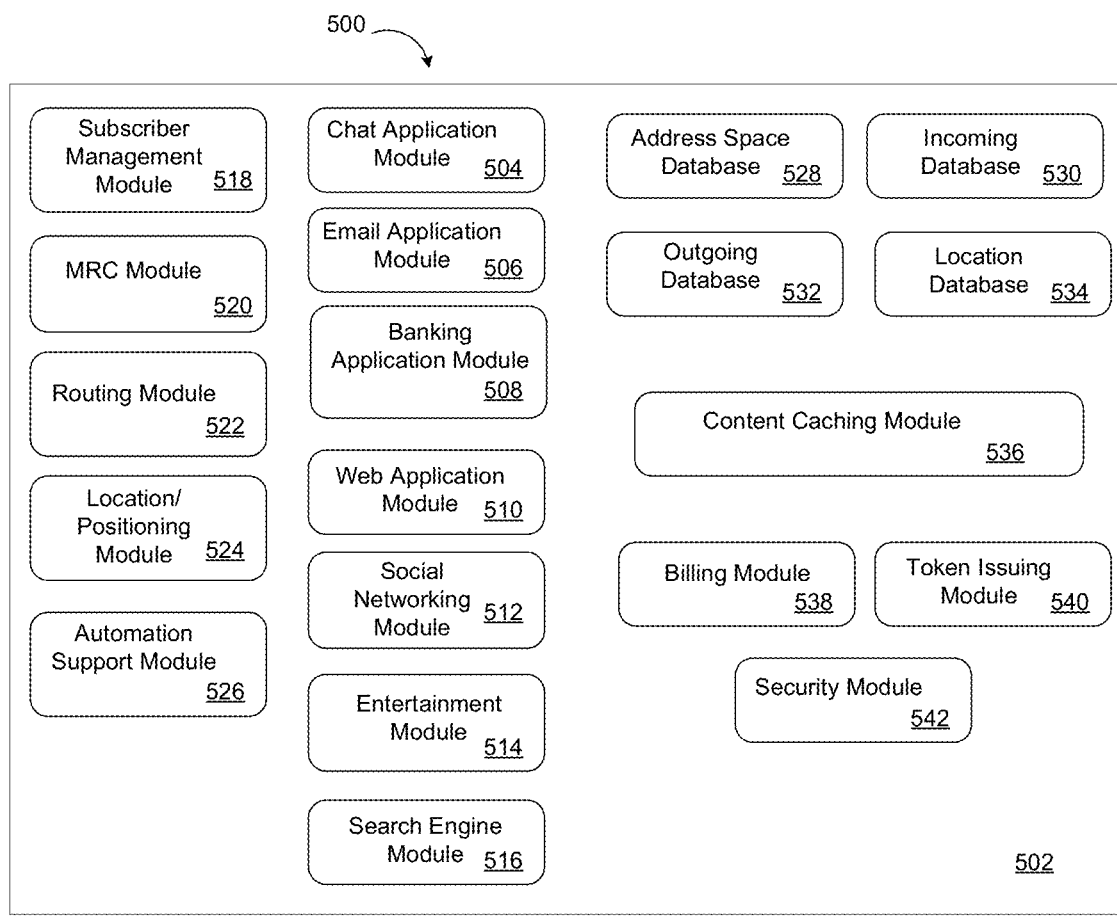
FIG. 5 illustrates a cloud architecture for facilitating exchange of information between various applications for routing delay-tolerant communication messages to the destination device in accordance with an embodiment of the invention.

FIG. 5 illustrates a cloud architecture 500 for facilitating exchange of information between various applications for routing delay-tolerant communication messages to the destination device in accordance with an embodiment of the invention.

As illustrated in FIG. 5, cloud architecture 500 includes a cloud platform 502 for facilitating exchange of information between a plurality of applications and ensure storage optimization using Artificial Intelligence (AI) algorithms. Cloud platform 502 includes a chat application module 504, an email application module 506, a banking application module 508, a web application module 510, a social networking module 512, and an entertainment module 514.

Chat application module 504 provides each subscriber with a unique chat id, to address anyone directly and to carry messages to the subscriber based on their location coordinates. Cloud platform 502 assigns the message to the most suitable vehicle based on mobility patterns of the vehicle for carrying the message to the destination.

Email application module 506 supports an email server, and assigns an email address to each subscriber. Cloud platform 502 manages emails via email application module 506.

Banking application module 508 enables users to integrate their bank information to cloud platform 502 for transferring money, which is secured by blockchain technology.

Web application module 510 provides web content to a user by transmitting a web page request to cloud platform 502 and enables cloud platform 502 to create the HTTP request for retrieving the information. Further, web application module 510 sends the information to the users via a moving vehicle.

Social networking module 512 enables each subscriber to maintain an account on cloud platform 502 for social networks and the information is pushed on to the subscriber.

Cloud platform 502 further includes entertainment module 514 that enables a subscriber to request for a video and offline content which is then retrieved from cloud platform 502 via associated apps such as, but not limited to, a video sharing app, a video on demand service app and the like, and then delivered to the subscriber.

Cloud platform 502 further includes various other modules such as, but not limited to, a search engine module 516, a subscriber management module 518, an MRC module 520, a routing module 522, a location/positioning module 524, an automation support module 526, an address space database 528, an incoming database 530, an outgoing database 532, a location database 534, a content caching module 536, a billing module 538, a token issuing module 540, and a security module 542, in accordance with various embodiments of the invention.

Figure 6:
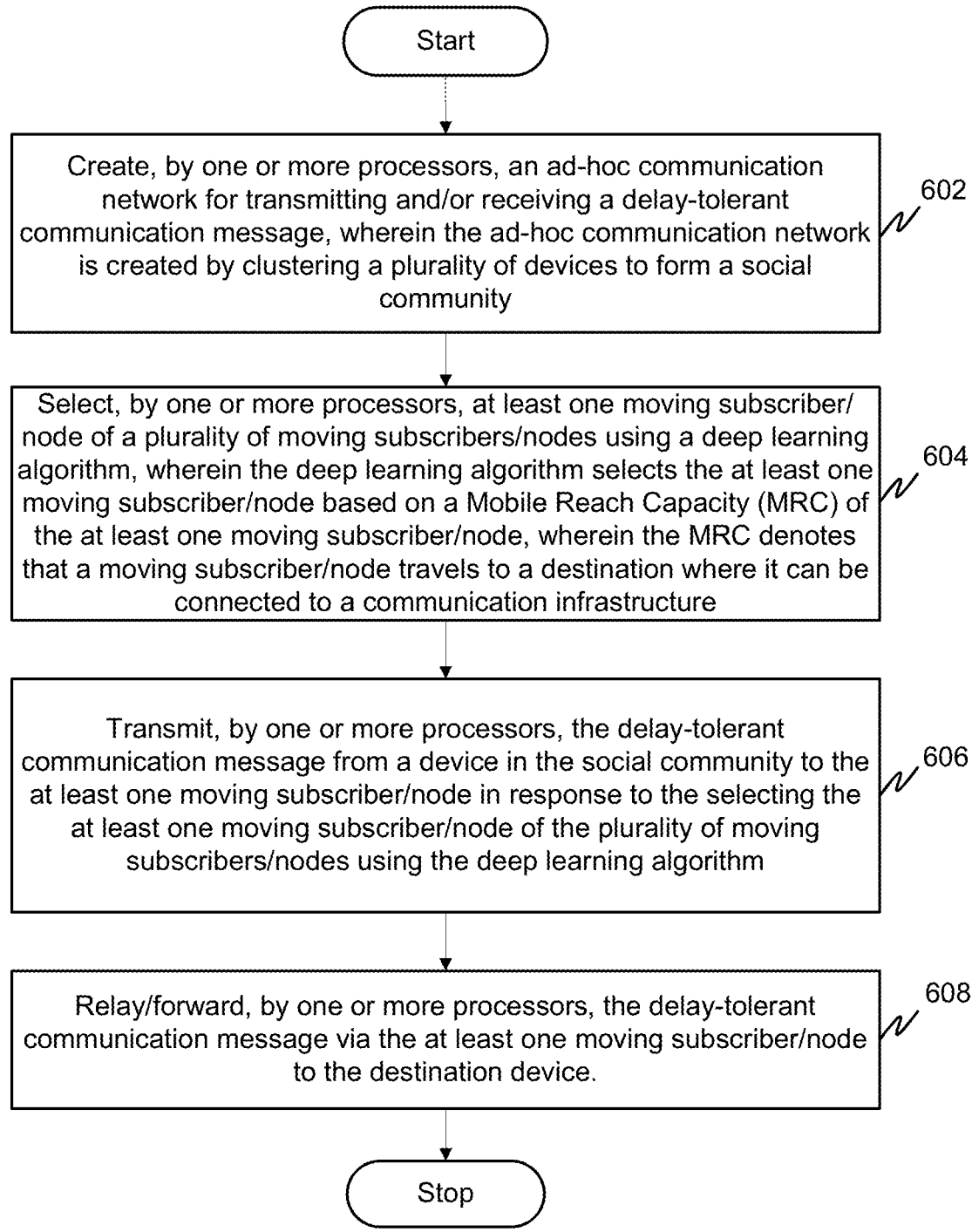
FIG. 6 illustrates a flowchart of a method for routing delay-tolerant communication messages to a destination device in accordance with an embodiment of the invention.

FIG. 6 illustrates a flowchart of a method for routing delay-tolerant communication messages to a destination device in accordance with an embodiment of the invention.

At step 602, ad-hoc hotspot connectivity module 108 is used to create an ad-hoc communication network for transmitting and/or receiving a delay-tolerant communication message, which may include, but need not be limited to, a chat message or an email message. The delay-tolerant communication message includes a destination address of a destination device, the destination address including, but not limited to, a local address, a global address, a multicast/broadcast address, and a geographic address.

The ad-hoc communication network is created by clustering a plurality of devices based on RSSI and signals received from a same access point to form a social community. The plurality of devices located in a vicinity without internet access connects to an ad-hoc hotspot either by enabling a device of the plurality of devices to enter a hotspot mode or by joining a hotspot of another device in the social community to connect and share any data/messages.

Once the hotspot mode is setup by the device of the plurality of devices, the device receives the delay-tolerant communication messages from the plurality of devices connected to the hotspot, and transmits the delay-tolerant communication messages to the destination device using one or more moving subscribers/nodes.

At step 604, subscriber/node selection module 112 is used to select one or more moving subscribers/nodes using deep learning module 114. Deep learning module 114 enables selecting the one or more moving subscribers/nodes based on an MRC feature of the one or more moving subscribers/nodes which is determined using MRC module 116. The MRC denotes that one or more moving subscribers/nodes travel to a destination where they can be connected to a communication infrastructure. The communication infrastructure may include, but need not be limited to, an Internet, a fixed network, a mobile network, and a satellite network.

Further, deep learning module 114 leverages MRC and pre-determined mobility patterns using smart mobility infrastructures which may include, but need not be limited to, a drive sharing or self-driving databases for enabling selection of the one or more moving subscribers/nodes. MRC module 116 is also used to measure a travelling frequency and destination traveled to of the one or more moving subscribers/nodes, to determine the MRC.

In an ensuing step 606, the delay-tolerant communication message received from a device in the social community is transmitted to the one or more selected moving subscribers/nodes using routing module 122.

At step 608, routing module 122 relays or forwards the delay-tolerant communication message through the one or more moving subscribers/nodes to the destination device based on GPS coordinates that are predefined or set by the one or more moving subscribers/nodes and the location coordinates added to an outgoing delay-tolerant communication message.

Further, the delay-tolerant communication message is progressively relayed or forwarded to the communication infrastructure, which enables the one or more moving subscribers/nodes to select one or more other moving subscribers/nodes to hand off the delay-tolerant communication message using location or positioning module 120.

The one or more moving subscribers/nodes use a map feature which charts out unconnected communities, and allows users in the one or more moving subscribers/nodes to select specific delay-tolerant communication messages to carry to the unconnected communities prior to their journey. Further, the map feature is also used to target or broadcast the delay-tolerant communication message to any unconnected area.

The invention does not require any infrastructural hardware such as, but not limited to, power stations, cell towers and fiber optic cables, making it cost-effective and easily scalable across every geographical location. Further, the invention relies on a cloud server powered by learned mobility patterns of moving subscribers/nodes (vehicles) and a simple mobile application, downloadable on smart devices. An omnibus communication network used in the invention is immune to any harm, including power shortages due to natural disasters. The invention is decentralized and flexible while each person in the community can act as a local server. Therefore, the invention holds the potential to democratize access to the internet by moving away from a centralized system.

Further, the invention ensures affordability and is strengthened by installing hardware (super nodes) in moving vehicles. The estimated cost for each installation is moderate with huge storage capacities and powerful antennas which substantially improve the system. Also, the hardware used for the system is extremely low cost compared to other available services.

Moreover, the invention improves social impact by providing local internet for everyone in a remote community. The community is provided with own internet which links to the outside world via vehicle traffic. For instance, an entrepreneur farmer in the remote community can improve his income by using social media to find buyers for his goods. In another instance, a digitally connected person can find, capture, and evaluate information, and develop critical thinking.

Further, the invention is greatly scalable because any one with a smart device can access the omnibus communication network. The invention builds a secure information architecture on a blockchain and a token-based incentive system for sustainability. The key financial cost is using cloud, which determines the MRC of subscribers and associated routing, along with storage capacity. Subsequently, the tokens are rewarded for using the application along with the transportation network for transporting the data. Tokens that are issued for usage decrease over time as usership grows and tokens that are issued for transporting the data may vary depending on geography and indigenous market dynamics.

The invention also provides delay tolerant connectivity that can be implemented by any community without any additional cost. As the number of moving vehicles participating in the system grows, the connection speed is dramatically improved, nearing levels of real-time connectivity.

Further, the invention dynamically expands the growing density of moving vehicles and provides privacy and security of information transmitted between users and the central cloud server using blockchain technology. The data stored by each user in a community is hidden from the main data frame and do not provide access to individuals.

Further, the invention utilizing smart devices as hotspot to transfer data may include different ranges, which vary between 32 to 72 meters (indoors and outdoors), that is approximately 0.5-acre area. Subsequently, a single mobile device hotspot can support more than 50 connected users and utilizes a hotspot fairness algorithm, where each person who has a mobile device is able to bounce the data to the next person and eventually transfer the data to the destination using the application. Therefore, the mobility reach, density and range may be limitless.

Moreover, the invention can easily be scaled up to access the whole of the internet. As the number of moving vehicles participating in the system grows, coverage and speed will dramatically improve. The delay tolerant connectivity to communities eliminates lags and runs a seamless system for all. As the system is enhanced, the invention provides access to the whole internet in real-time.

The invention also provides minimum limitations in providing connectivity within a local community. Similarly, information can be taken out from a region and brought back via the cloud. Limitation arises when a number of communities increases and the cloud has to be smart enough to determine the MRC of subscribers and the associated routing. Eventually, the system overcomes the problems related to local storage capacity, which can be tackled with AI/machine learning algorithms to optimize the storage.

The omnibus networking of the invention is mainly used to translate routing requests from the omnibus network into action using transportation performed by vehicles. The omnibus network defines a routing intent and enforces the routing requests according to mobility patterns. The end-to-end protocol architecture of the invention verifies that the routing intent can be executed before transmitting the requests.

Further, the application used in the cloud monitors network resources to achieve the desired state and then enforces policies on it with respect to a given routing intent economics.

Further, the protocol system can gather data, which is used to constantly monitor the state of the protocol network. The protocol system also ensures that the desired state of the omnibus network is maintained at all times and ensures that the system chooses the best possible way to implement the desired state using machine learning tools for selecting automated corrective actions to maintain the state.

Therefore, the invention provides affordable internet access to every region and every community with minimum infrastructure cost albeit in low quality and delays in data delivery. The invention also uses an improved routing method while the traditional fixed, mobile and satellite communication infrastructures fail, and ensures the functionality of today's Internet on the ground and enables reachability to information.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A computer-implemented method for routing delay-tolerant communication messages to a destination device, the method comprising:
   creating, by one or more processors, an ad-hoc communication network for transmitting and/or receiving a delay-tolerant communication message, wherein the ad-hoc communication network is created by clustering a plurality of devices to form a social community;
   quantifying travelling frequencies and routine destinations of a plurality of moving subscribers/nodes into a respective mobile reach capacity (MRC) measure for each moving subscriber/node;
   predicting a routing path for the delay-tolerant communication message by applying artificial intelligence (AI) to the respective MRC measures of the plurality of moving subscribers/nodes to predict future locations at future times of each of the plurality of moving subscribers/nodes, wherein the MRC measure denotes that a given moving subscriber/node travels to a destination where the moving subscriber/node connects to a communication infrastructure;
   optimizing the routing path of the delay-tolerant communication message by applying the AI to a respective storage capacity of each moving subscriber or each moving node of the plurality of moving subscribers/nodes in the routing path being predicted;
   selecting, by one or more processors, at least one moving subscriber/node of the plurality of moving subscribers/nodes using a deep learning algorithm of the AI, wherein the deep learning algorithm selects the at least one moving subscriber/node based at least on the MRC of the at least one moving subscriber/node;

transmitting, by one or more processors, the delay-tolerant communication message from a device in the social community to the at least one moving subscriber/node in response to the selecting the at least one moving subscriber/node of the plurality of moving subscribers/nodes using the deep learning algorithm; and relaying/forwarding, by one or more processors, the delay-tolerant communication message via the at least one moving subscriber/node to the destination device.

2. The computer-implemented method of claim 1, wherein the delay-tolerant communication message is one of a chat message and an email message.

3. The computer-implemented method of claim 1, wherein the delay-tolerant communication message includes a destination address of the destination device, wherein the destination address is one of a local, global, multicast/broadcast address and geographic address.

4. The computer-implemented method of claim 1, wherein the plurality of devices are clustered based on Received Signal Strength Indicator (RSSI) and signals received from a same access point, and wherein the devices in the social community connect and share any data/messages.

5. The computer-implemented method of claim 1 further comprises enabling, by one or more processors, the device of the plurality of devices in the social community located in a vicinity without internet, to connect to an ad-hoc hotspot either by entering a hotspot mode or joining a hotspot of another device in the social community, wherein a hotspot mode is a state wherein a device sets up its own hotspot.

6. The computer-implemented method of claim 5 comprises periodically ensuring, by one or more processors, that the act of entering the hotspot mode is shared in a load-balanced manner among the devices in the social community.

7. The computer-implemented method of claim 1, wherein a moving subscriber/node comprises one of a vehicle or a pedestrian, wherein the moving subscriber/node carries a Wi-Fi integrated communication device.

8. The computer-implemented method of claim 7, wherein the Wi-Fi integrated communication device is one of a mobile device, a smart phone, a handset, a laptop and a tablet.

9. The computer-implemented method of claim 1, wherein the deep learning algorithm leverages MRC and pre-determined mobility patterns from drive share or self-driving databases for enabling selection of the at least one moving subscriber/node.

10. The computer-implemented method of claim 1 further comprises predicting a time and destination of a trip for each moving subscriber/node using a Cartesian Neural Network.

11. The computer-implemented method of claim 1, wherein the relaying/forwarding comprises encrypting and storing, by one or more processors, the delay-tolerant communication message on the at least one moving subscriber/node.

12. The computer-implemented method of claim 1, wherein the communication infrastructure is one of an Internet, a fixed network, a mobile network and a satellite network.

13. The computer-implemented method of claim 1, wherein the relaying/forwarding further comprises progressively relaying/forwarding, by one or more processors, the delay-tolerant communication message to the communication infrastructure, wherein the progressively relaying/forwarding comprises enabling, by one or more processors, the at least one moving subscriber/node to select at least one other moving subscriber/node to hand off the delay-tolerant communication message.

14. The computer-implemented method of claim 13, wherein the moving subscriber/node uses a map feature which charts unconnected communities, allowing a moving subscriber/node to select specific delay-tolerant communication messages to carry to the unconnected communities prior to moving on the routing path.

15. A system for routing delay-tolerant communication messages to a destination device, the system comprising:

a memory;

a processor communicatively coupled to the memory, wherein the processor is configured to:

create an ad-hoc communication network for transmitting and/or receiving a delay-tolerant communication message, wherein the ad-hoc communication network is created by clustering a plurality of devices to form a social community;

quantify travelling frequencies and routine destinations of a plurality of moving subscribers/nodes into a respective mobile reach capacity (MRC) measure for each moving subscriber/node;

predict a routing path for the delay-tolerant communication message by applying artificial intelligence (AI) to the respective MRC measures of the plurality of moving subscribers/nodes to predict future locations at future times of each of the plurality of moving subscribers/nodes, wherein the MRC measure denotes that a given moving subscriber/node travels to a destination where the moving subscriber/node connects to a communication infrastructure;

optimize the routing path of the delay-tolerant communication message by applying the AI to a respective storage capacity of each moving subscriber or each moving node of the plurality of moving subscribers/nodes in the routing path being predicted;

select at least one moving subscriber/node of the plurality of moving subscribers/nodes using a deep learning algorithm of the AI, wherein the deep learning algorithm selects the at least one moving subscriber/node based on the MRC measure of the at least one moving subscriber/node, wherein the MRC measure denotes that a moving subscriber/node travels to a destination where the moving subscriber/node connects to a communication infrastructure;

transmit the delay-tolerant communication message from a device in the social community to the at least one moving subscriber/node in response to the selecting the at least one moving subscriber/node of the plurality of moving subscribers/nodes using the deep learning algorithm; and relay/forward the delay-tolerant communication message via the at least one moving subscriber/node to the destination device.

16. The system of claim 15, wherein the plurality of devices are clustered based on Received Signal Strength Indicator (RSSI) and signals received from a same access point, and wherein the devices in the social community connect and share any data/messages.

17. The system of claim 15, wherein the processor is configured to enable the device of the plurality of devices in the social community located in a vicinity without internet, to connect to an ad-hoc hotspot either by entering a hotspot mode or joining a hotspot of another device in the social community, wherein a hotspot mode is a state where a device sets up its own hotspot.

18. The system of claim 17, wherein the processor is further configured to periodically ensure that the act of entering the hotspot mode is shared in a load-balanced manner among the devices in the social community.

19. The system of claim 15, wherein the deep learning algorithm leverages MRC measures and pre-determined mobility patterns from drive share or self-driving databases for enabling selection of the at least one moving subscriber/node, wherein the MRC measure comprises a quantification of a travelling frequency and at least one destination of the at least one moving subscriber/node.

20. The system of claim 15, wherein the processor is configured to predict a time and a destination of a trip for each moving subscriber/node using a Cartesian Neural Network.

21. The system of claim 15, wherein the processor is configured to encrypt and store the delay-tolerant communication message on the at least one moving subscriber/node.

22. The system of claim 15, wherein the processor is further configured to progressively relay/forward the delay-tolerant communication message to the communication infrastructure, and enable the at least one moving subscriber/node to select at least one other moving subscriber/node to hand off the delay-tolerant communication message.

23. The system of claim 22, wherein the moving subscriber/node uses a map feature which charts out unconnected communities, allowing users in the moving subscriber/node to select specific delay-tolerant communication messages to carry to the unconnected communities prior to their journey.

* * * * *